(12) United States Patent
Ettig et al.

(10) Patent No.: US 9,983,050 B2
(45) Date of Patent: May 29, 2018

(54) HOUSING FOR A LABORATORY INSTRUMENT

(71) Applicant: BRAND GMBH + CO KG, Wertheim (DE)

(72) Inventors: Wolfgang Ettig, Külshiem (DE); Steffen Gehrig, Walldürn (DE)

(73) Assignee: BRAND GMBH + CO KG, Wertheim (DE)

( * ) Notice: Subject to any disclaimer, the term of this patent is extended or adjusted under 35 U.S.C. 154(b) by 90 days.

(21) Appl. No.: 15/123,273

(22) PCT Filed: Feb. 26, 2015

(86) PCT No.: PCT/EP2015/000438
§ 371 (c)(1),
(2) Date: Sep. 2, 2016

(87) PCT Pub. No.: WO2015/131985
PCT Pub. Date: Sep. 11, 2015

(65) Prior Publication Data
US 2017/0074718 A1    Mar. 16, 2017

(30) Foreign Application Priority Data
Mar. 4, 2014   (DE) .................. 20 2014 001 872 U

(51) Int. Cl.
*G01G 21/28*   (2006.01)
*E05D 5/06*    (2006.01)
*E05D 5/02*    (2006.01)

(52) U.S. Cl.
CPC ........... *G01G 21/286* (2013.01); *E05D 5/065* (2013.01); *E05D 2005/0261* (2013.01); *E05Y 2201/11* (2013.01); *E05Y 2900/202* (2013.01)

(58) Field of Classification Search
CPC .. G01G 21/28; G01G 21/286; E05Y 2900/20; E05Y 2900/202; E05Y 2201/10; E05Y 2201/11; E05D 5/0246; E05D 2005/0261; E05D 5/065
See application file for complete search history.

(56) References Cited

U.S. PATENT DOCUMENTS

| 4,705,187 A | 11/1987 | Linn |
| 6,129,237 A | 10/2000 | Miyahara |
| 7,834,278 B1 | 11/2010 | Zeiss et al. |

FOREIGN PATENT DOCUMENTS

EP        1 055 38 A2    11/2000

*Primary Examiner* — Randy Gibson
(74) *Attorney, Agent, or Firm* — David S. Safran

(57) ABSTRACT

A housing for a laboratory device, having floor, ceiling, rear, side, and front walls, which together form an operating chamber, wherein the front wall is movable upward and downward between a lowered closed position and a raised open position in a linear and simultaneously pivoting manner and, in the open position of the front wall, the operating chamber is open on the front side of the housing. The top wall section having top and bottom wall sections connected about a first pivot axis and transitions in an arc shape to a plate-shaped connection section extending at an angle to the top wall section, or is connected thereto in an angularly rigid manner, and a connection section is hinged in a pivoting manner to the ceiling on the edge thereof distant from the top wall section parallel to the first pivot axis, at a distance from the front wall.

16 Claims, 5 Drawing Sheets

HOUSING FOR A LABORATORY INSTRUMENT

BACKGROUND OF THE INVENTION

Field of the Invention

The invention relates to a housing for a laboratory instrument, comprising a floor, ceiling, rear wall, side walls and front wall, which jointly form a working chamber.

Description of Related Art

The known housing for a laboratory instrument on which the invention is based (European Patent EP 2 217 894 B1 and corresponding U.S. Pat. No. 7,834,278 B1) disclose a housing for an analytical balance. Laboratory instruments of the type in question here are preferably balances for very low weights, but can also be other instruments, for example motorized metering devices, etc. In the present case, we are dealing with the housing in whose working chamber such a laboratory instrument is found. Such a housing serves to protect the laboratory instrument.

Minute external influences which act on the laboratory instrument can falsify measurement results, in the case of an analytical balance can falsify the weighing result. In order to protect the laboratory instrument, the working chamber in which the laboratory instrument is found is enclosed, so that air movements in the ambient atmosphere are kept as remote as possible from the laboratory instrument. Also in laboratory instruments which transport samples, pollution can occur via air movements in the form of contamination. In laboratory instruments of this kind, motor-driven components are found in the working chamber and the housing here serves as protection for the user.

In the prior art on which the invention is based, it is stated that increasingly multifunctional work processes take place in the working chamber of such a housing. Metering units, holding devices for receptacles, such as microtiter plates, etc., indicating devices, etc., are operated in the working chamber. The working chamber must therefore be easily accessible when the housing is open.

SUMMARY OF THE INVENTION

In the known housing on which the invention is based, on the one hand, the front wall is linearly and, at the same time, pivotably movable upward and downward between a lowered closed position and a raised open position, and in the open position, opens up the working chamber from the front side, while on the other hand the side walls found to the right and left of the front wall are displaceable over a subregion between a front closed position and a rearwardly offset open position. The opening and closing movement is predominantly effected manually by the user. The moved masses and their end positions are not user-friendly.

In the known housing on which the invention is based, the complete front wall is configured as a plate-like, rigid unit. It is displaceably guided on the top edge of the ceiling of the housing, on the right and left, in lateral linear guides. These linear guides themselves are pivotably attached thereon, so that a horizontal pivot axis for the pivotable linear guides is defined.

On the top edge of the front wall, a strip-shaped pivot bracket of slightly arcuate design is placed pivotably about a pivot axis parallel to the first pivot axis. At around a third of the depth of the ceiling of the housing, this pivot link is attached by its other end pivotably to the ceiling about a third pivot axis. The pivot link serves to control the pivot movement of the front wall in dependence on the linear displacement thereof in the lateral linear guides.

For housings of the type in question, the spatial requirement above the housing is of fundamental importance. Housings of this type are frequently used in a cramped laboratory environment. The smaller the spatial requirement above the housing, the better.

Also of importance is good accessibility of the working chamber through a front side opened as wide as possible.

In addition, for an, as far as possible, undisturbed atmosphere in the working chamber it is important that the front wall moves as far as possible broadly like a cutting closure means. As is described in the prior art forming the basis of the invention, a closure means is denoted as cutting when it cuts through the air in the course of the opening and closing and therefore causes only a small air movement. A cutting closure means has the effect that, when the working chamber is closed off, the air inside the working chamber quickly comes to rest again. By contrast, a pivoting closure means moves large air masses also within the working chamber, which causes considerable air movements within the working chamber.

SUMMARY OF THE INVENTION

The invention is based on the problem of designing and refining the known housing for a laboratory instrument towards a small spatial requirement above the housing and an optimally favorable movement of the front wall.

The housing according to the invention is intended to accommodate a laboratory instrument or a plurality of laboratory instruments of any type. Here, general reference is made to the above background description. The housing fundamentally comprises a floor, cover, rear wall, side walls and front wall, which jointly form a working chamber. This specific description is based on an essentially box-shaped or cube-shaped housing. It is not precluded, however, that the housing has a different layout. For example, it is possible that the housing has a triangular layout. In this case, the rear wall would functionally be jointly formed by the two side walls which form the legs of the triangle. In the case of a different layout, for example, a pentagonal layout, the side walls would have a plurality of portions running at an angle to one another. All of these layouts also fall within the scope of the invention.

Functionally, the accessibility of the housing is created in accordance with the invention by the mobility of the front wall. The front wall is linearly and, at the same time, pivotably movable upward and downward between a lowered closed position and a raised open position. In the open position, the working chamber is then open on the front side and the desired works can be carried out in the working chamber.

According to the invention, it is now, firstly, provided that the front wall is not configured continuously as a plate-like, rigid unit, but instead has a bottom plate-like wall portion and a top plate-like wall portion connected to the bottom wall portion pivotably about a first horizontal pivot axis. As has likewise been noted in the prior art, the bottom wall portion can also per se, however, again be formed of a plurality of mutually coupled sections, similar to the design of a sectional gate known per se from the prior art, such as is used, for example, for garage entrances.

For the present discussion of the invention, we assume for the sake of simplicity, but without limitation, that the bottom plate-like wall portion forms a plate-like unit.

According to the invention, the bottom wall portion, on or close to the bottom edge, is provided with lateral guide elements, which mutually define a second pivot axis, parallel to the first pivot axis, for the bottom wall portion. Close to the bottom edge are found the bottom guide elements, preferably when the remaining protrusion of the bottom wall portion of the front wall in relation to the horizontal pivot axis amounts in the closed position to less than 40% of the height of the front wall.

At the right and at the left sides of the front wall are arranged vertically upward running lateral guides, in which, for the movement of the front wall, the lateral guide elements are movable upward and downward. The first horizontal pivot axis is thus fixed on the bottom wall portion of the front wall. The bottom wall portion of the front wall is displaced nonlinearly in relation to the pivot axis. The pivot axis itself, however, moves upward and downward in the lateral guides to the right and left of the front wall.

The top wall portion of the front wall is pivotably connected to the bottom wall portion. The top wall portion itself merges arcuately into a plate-like connecting portion running at an angle to the top wall portion. In this context, "arcuately" means only that the transition of the wall portion into the connecting portion is not sharp-edged, but is instead effected with an arc radius which can be realized in a practically reasonable manner. The two pieces are in one piece in this case.

As an alternative, an angularly rigid connection of the top wall portion to the connecting portion is also possible. In this case, a sharp-edged, angularly rigid connection can also be realized. Here, the connecting portion can also be a structural element which is separate from the top wall portion and which is connected in an angularly rigid manner to the wall portion via a corner connector or the like.

It is then the connecting portion of the housing according to the invention which, by its edge remote from the top wall portion, that is attached to the ceiling, at a distance from the front wall, pivotably about a third pivot axis parallel to the first pivot axis.

As a result of the angular configuration of the connection formed of a top wall portion and a connecting portion, the motional sequence of the front wall in the opening and closing operation is more favorable, because less space is required above the housing. The angular design is broadly warp-resistant, so that the front wall is guided upward and downward in a secure and tilt-free manner. The position of the first horizontal pivot axis on the bottom wall portion fixedly defines the forward protrusion of the bottom wall portion. The outward pivoting of the front edge of the front wall can thereby be precisely predefined and limited. The front wall extends almost exclusively sharply downward in the closing movement.

According to the preferred embodiment, it is provided that the connecting portion is arranged at a right angle to the top wall portion. Thus, in the closed position, the connecting portion then extends parallel to the ceiling and the top wall portion extends parallel to or in alignment with the bottom wall portion of the front wall.

Moreover, it is particularly expedient if the connecting portion has substantially the same width as the top wall portion of the front wall.

For the reproducibility of the operations in the working chamber, according to the preferred teaching it is particularly expedient that the wall portions of the front wall, and preferably also the connecting portion, consist of transparent material, in particular of glass or of acrylic. Moreover, the other walls and the ceiling of the housing can also consist of transparent material of this type in order to allow the inside of the working chamber to be viewed from all sides.

As has already been mentioned above, particularly preferred embodiments and refinements of the housing according to the invention are described below in conjunction with the accompanying drawings.

DETAILED DESCRIPTION OF THE INVENTION

Figure 1:
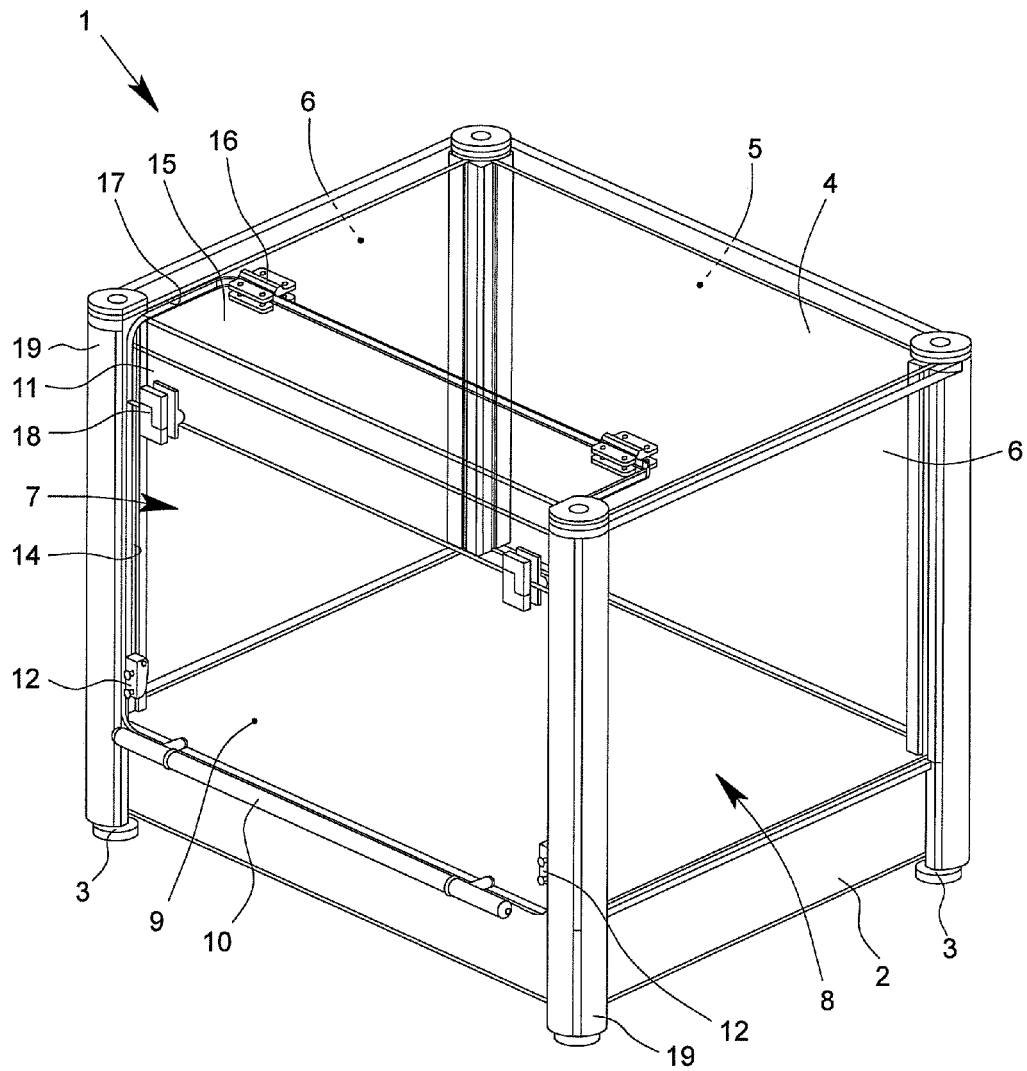
FIG. 1 shows a first illustrative embodiment of a housing according to the invention with a front wall in the closed position.

The subject of the invention is a housing 1 for a laboratory instrument that has a floor 2, here with supporting feet 3, a ceiling 4, which closes off the housing 1 at the top, a rear wall 5, side walls 6 and a front wall 7. The parts jointly enclose a working chamber 8, which in the represented illustrative embodiment, however, is empty.

Already in the general part of the description, it has been pointed out that essentially any chosen equipment can be found in the working chamber 8. However, a laboratory instrument, such as, in particular, a balance, represents a good example.

The represented illustrative embodiment shows the housing 1 as having a box-shaped form, which could have a width of, for instance, 600 mm, a depth of, for instance, 500 mm, and a height also of, for instance, 500 mm, including the supporting feet 3. In the represented illustrative embodiment, the height of the front wall 7 itself amounts, by way of example, to 400 mm, for instance, in a housing having the above dimensions. These specifications should not be interpreted as limiting, they are meant merely to convey a sense of the order of magnitude of the typical housing 1 of the type to which the invention is directed.

Already in the general part of the description, it has been pointed out that the housing 1 does not necessarily have to be box-shaped, and can have very different layouts. Reference is made here to the statements in the background part of the description relative to this aspect. The represented and preferred illustrative embodiment shows with a substantially box-shaped housing 1 in an only preferred, non-limiting illustrative embodiment.

Figure 2:
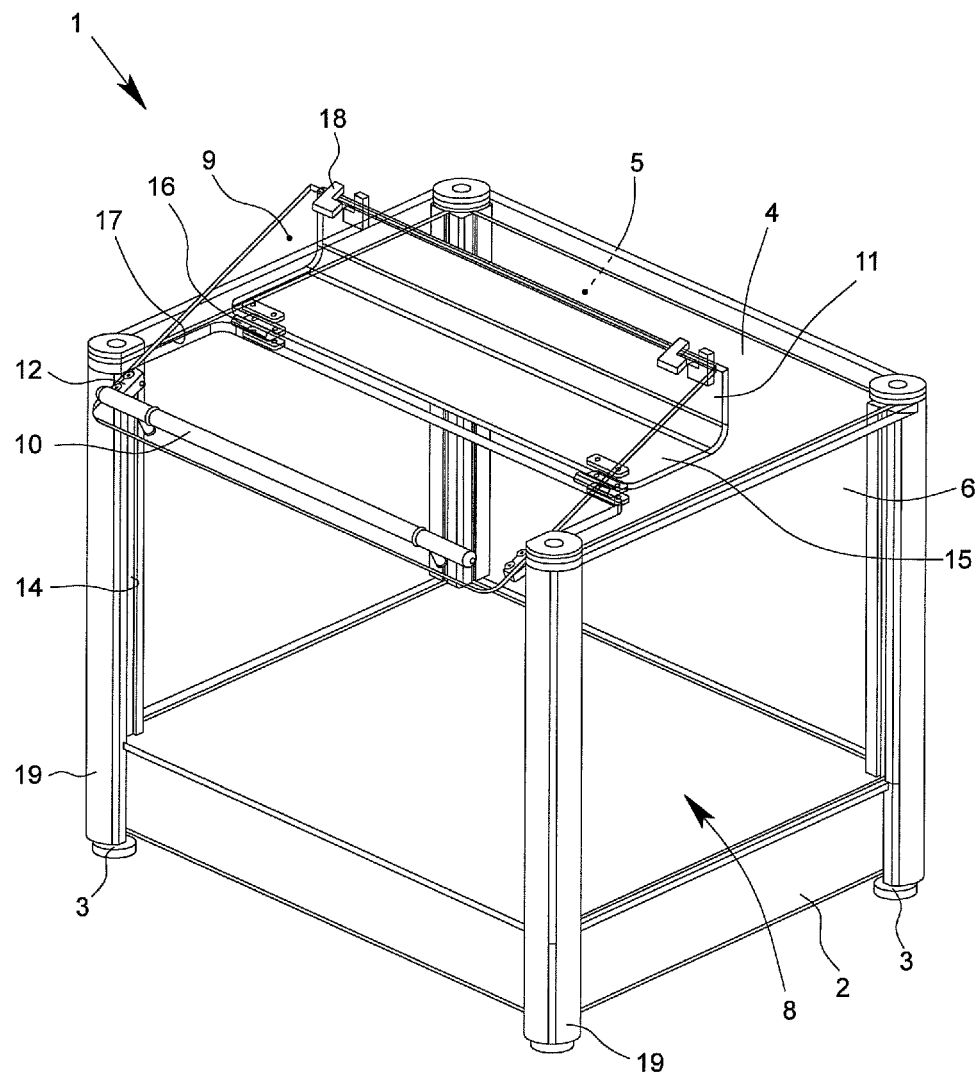
FIG. 2 shows the housing from FIG. 1 with the front wall in the open position.

From a combination of FIG. 1, which shows the closed housing 1, with FIG. 2, which shows the open housing 1, it can be seen that the front wall 7 is linearly, and at the same time, pivotably movable upward and downward between a lowered closed position represented in FIG. 1 and a raised open position represented in FIG. 2. As FIG. 2 shows, in the open position of the front wall 7, the working chamber 8 is open on the front side. Only in the topmost region of the front side is the bottom edge of the front wall 7 still present; but, almost the entire front side is open.

In the represented illustrative embodiment, the side walls 6 of the housing 1 are of fixed construction. This should likewise not be interpreted as limiting. Openable side walls 6, as in the prior art described in the introduction, can also be used if the design of the housing 1 suggests that this is advantageous.

FIGS. 1 and 2 in association clearly reveal that the front wall 7 has a bottom plate-like wall portion 9, and a top plate-like wall portion 11 that is pivotably connected to the bottom wall portion 9 for movement about a first horizontal pivot axis, that the bottom wall portion 9, on or close to the bottom edge, is provided with lateral guide elements 12, which mutually define a second pivot axis, parallel to the first pivot axis, for the bottom wall portion 9, that to the right and left side of the front wall 7 are arranged vertically upward-running lateral guides 14, that, for the movement of the front wall 7, the lateral guide elements 12 run in the lateral guides 14 and are movable upward and downward therein, that the top wall portion 11 merges arcuately into a plate-like connecting portion 15 running at an angle to the top wall portion 11 or is connected thereto in an angularly rigid manner, and that the connecting portion 15, by its edge remote from the top wall portion 11, is pivotably attached to the ceiling 4, at a distance from the front wall 7, for movement about a third pivot axis that is parallel to the first pivot axis.

The pivotable attachment of the connecting portion 15 to the ceiling 4 is effected via hinges 16 which are arranged thereon.

A handle bar 10 is provided on the bottom edge of the bottom wall portion 9 for use in raising the front wall 7. Alternatively and not represented in the figures, a motor drive can be provided for the opening and closing of the front wall 7, as is shown, for example, in the cited prior art in U.S. Pat. No. 7,834,278, which is incorporated by reference with respect to such a drive. This can drive the connecting portion 15. Advantageously, the drive train extends, however, wholly or partially in the lateral guides 14 and is connected on both sides to the guide elements 12.

In the represented illustrative embodiment, the top wall portion 11 and the connecting portion 15 are constructed in one piece. They merge one into the other with an appropriate arc radius.

A variant in which the two portions meet with a sharp edge and are either constructed in one piece or are connected to each other via a corner connector which realizes the angularly rigid connection is not represented.

From the comparison of FIG. 1 with FIG. 2, the considerable advantages of the design according to the invention are apparent at first glance. In the open position of the front wall 7, the front side of the housing 1 is open as wide as possible. The access to the working chamber 8 is very good. The protrusion of the bottom edge of the front wall 7 in the open position is small. Consequently, the surface area which executes a pivot movement upon the closure of the front wall 7 is likewise small. The angularly rigid connection of top wall portion 11 and connecting portion 15 gives the front wall 7 high stability overall, so that it is guided laterally in the guides 14 in a secure and tilt-free manner. The opening and closing movement proceeds essentially frictionlessly.

Due to the angular construction of top wall portion 11 and the connecting portion 15, the spatial requirement above the ceiling 4 of the housing 1 is comparatively small. The connecting portion 15 pivots outward relatively little, because it transports a further part of the front wall 7, namely the top wall portion 11.

The swirling of the air upon the opening and closing of the front wall 7 takes place materially only above the ceiling 4, so that the air in the working chamber 8 remains relatively undisturbed.

Upon the opening of the front wall 7, an upwardly progressively decreasing opening force is required. In the open position, the front wall 7 is held in an inherently stable position.

According to the preferred teaching, which FIGS. 1 and 2 also show in comparison, it is further provided that the connecting portion 15 is arranged at a right angle to the top wall portion 11. This corresponds to the box-shaped design of the housing 1 in total, in which housing the ceiling 4 extends at a right angle to the front wall 7.

In the represented and preferred illustrative embodiment, it is further provided that the connecting portion 15 has substantially the same width as the top wall portion 11 of the front wall 7 or as the entire front wall 7. A high stability of the total structure with its moving parts is thus obtained.

In the background portion of this description, based on the prior art which is discussed there, it has been pointed out that the bottom wall portion 9 can essentially also consist of two or more mutually coupled sections, for instance just as in a sectional door. That is not shown in the represented illustrative embodiment, but is a possible variant of the teaching of the invention.

The illustrative embodiment which is represented in FIGS. 1 and 2, and to this extent is likewise preferred, further shows that all walls of the housing 1 and the ceiling 4 thereof are formed of a transparent material, which, according to the preferred teaching, are made of glass. As the material, a transparent plastic, in particular acrylic, is also possible to use, however, in other applications. For particular use with light sensitive or specific substances, it is provided to use material for the walls which is opaque to visible light or to a specific region of the spectrum, such as, for instance, material impermeable or broadly opaque to UV light.

Consequently, in the represented illustrative embodiment, in terms of the front wall 7, the wall portions 9, 11 similarly consist of glass, like the connecting portion 15. Specifically for the user standing in front of the closed housing 1, the view through the portions 11 and 15 from above is thus possible without obstruction. The view into the working chamber 8 in each position, closed position and open position, is also substantially clear.

The preferred illustrative embodiment shown in FIGS. 1 and 2 now shows a further particularity to the effect that the ceiling 4 has, in the region of the connecting portion 15, a recess 17 which emanates from the front wall 7 and is matched in size to the connecting portion 15, and that, when the front wall 7 is in the closed position, the connecting portion 15 lies, closing the ceiling 4, in the recess 17. In FIG. 1, the connecting portion 15 can be seen lying, closing the ceiling 4, in the recess 17. The outer face of the housing 1 is thus continuously closed in the region of the transition from the ceiling 4 into the front wall 7. In FIG. 2, the open position of the front wall 7 can be seen. Here, the recess 17 in the ceiling 4, into which the connecting portion 15 intrudes upon the closure of the front wall 7, can be seen particularly clearly.

Figure 3:
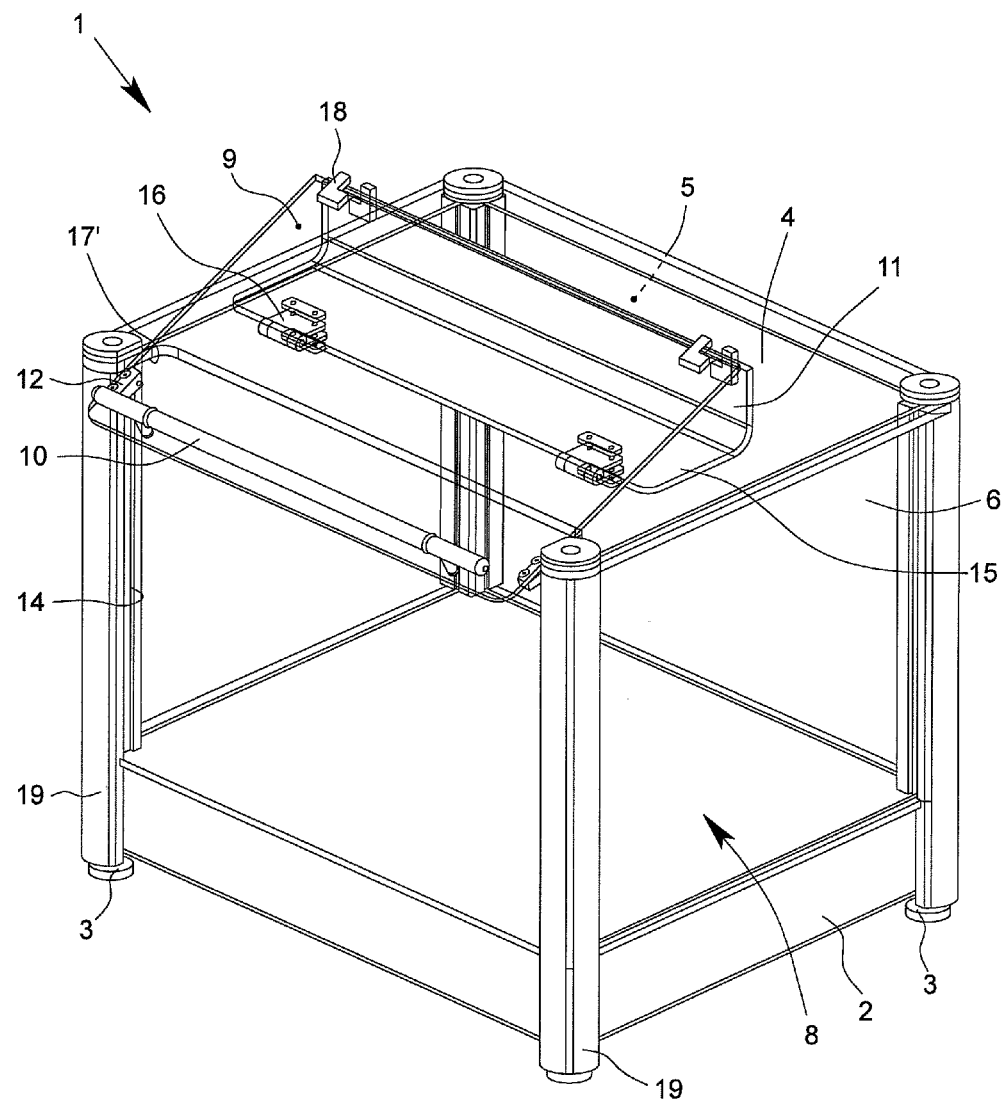
FIG. 3 is a representation corresponding to FIG. 2, but of a further illustrative embodiment of a housing according to the invention.

FIG. 3 shows another embodiment in a representation corresponding to FIG. 2, i.e., with the front wall 7 in the open position. Here, the recess 17' emanating from the front wall 7 has merely such a depth that the bottom plate-like wall portion 9, in the upward and downward movement, specifically does not touch the edge of the recess 17'. The attachment of the connecting portion 15 to the ceiling 4 thus here lies on the ceiling 4, the connecting portion 15 does not intrude into a recess in the ceiling 4, but instead, when the front wall 7 is in the closed position, lies on the ceiling 4. The connecting portion 15 here covers the recess 17' of small depth and terminates it in the upward direction. In this design, upon the closure of the front wall 7, the air volume in the air chamber above the ceiling 4 is not primarily shifted downward into the working chamber 8, but is instead quite predominantly forced out laterally to the right and left. In certain circumstances, that has application-related advantages. As can be seen, the two-stage nature of the housing 1 in the region of the ceiling 4 is possibly a drawback here.

Back to the illustrative embodiment represented in detail in FIGS. 1 and 2. Here, it is further provided that, for the pivotable connection of the top wall portion 11 to the bottom wall portion 9, hinges 18, the pivot path of which is stop-limited at 180°, are provided. The limitation of the hinges 18 by stops can be seen particularly clearly in FIG. 1. In the closed position of the front wall 7, the bottom wall portion 9 and the top wall portion 11 are hence oriented in exact mutual alignment and stiffened to form a plate-like unit.

In terms of the dimensions of the various components of the housing 1 according to the invention, it is advisable that the top wall portion 11 has a height of 10% to 40% of the height of the complete front wall 7, and/or that the connecting portion 15 has a depth (front to back distance) of 10% to 40% of the depth of the complete ceiling 4. In the represented illustrative embodiment, the top wall portion 11 has a height of, for instance, 15% of the height of the complete front wall 7 and the connecting portion 15 has a depth of, for instance, 25% of the depth of the complete ceiling 4. The lateral guide elements 12, close to the bottom edge of the bottom wall portion 9 of the front wall 7, lie at a height of, for instance, 10% of the height of the complete front wall 7. These measurements too are all merely exemplary for the purpose of a concrete understanding of the design of the preferred illustrative embodiment.

In principle, it would be possible to have at least some of the walls of the housing 1 abut directly one against the other. In the represented and, to this extent, preferred illustrative embodiment, it is provided however that on those edges of the side walls 6 which are facing toward the front wall 7 are disposed vertically arranged corner elements 19. Such corner elements 19 are also provided on those edges of the side walls 6 which are facing toward the rear wall 5 and which there rigidly and fixedly connect the rear wall 5 to the side walls 6 and to the ceiling 4.

The corner elements 19 disposed on the front wall 7 bear the lateral guides 14. Preferably, these are disposed in the corner elements 19. In the represented illustrative embodiment, the lateral guides 14 are constituted by vertically running guide rails arranged in the corner elements 19. In these guide rails, which form the lateral guides 14, run the lateral guide elements 12 on the bottom wall portion 9 of the front wall 7, which are constructed, for example, as sliding blocks made of slidable plastic. These lateral guide elements 12 are represented in the figures together with their fastening blocks on the wall portion 9.

Figure 4:
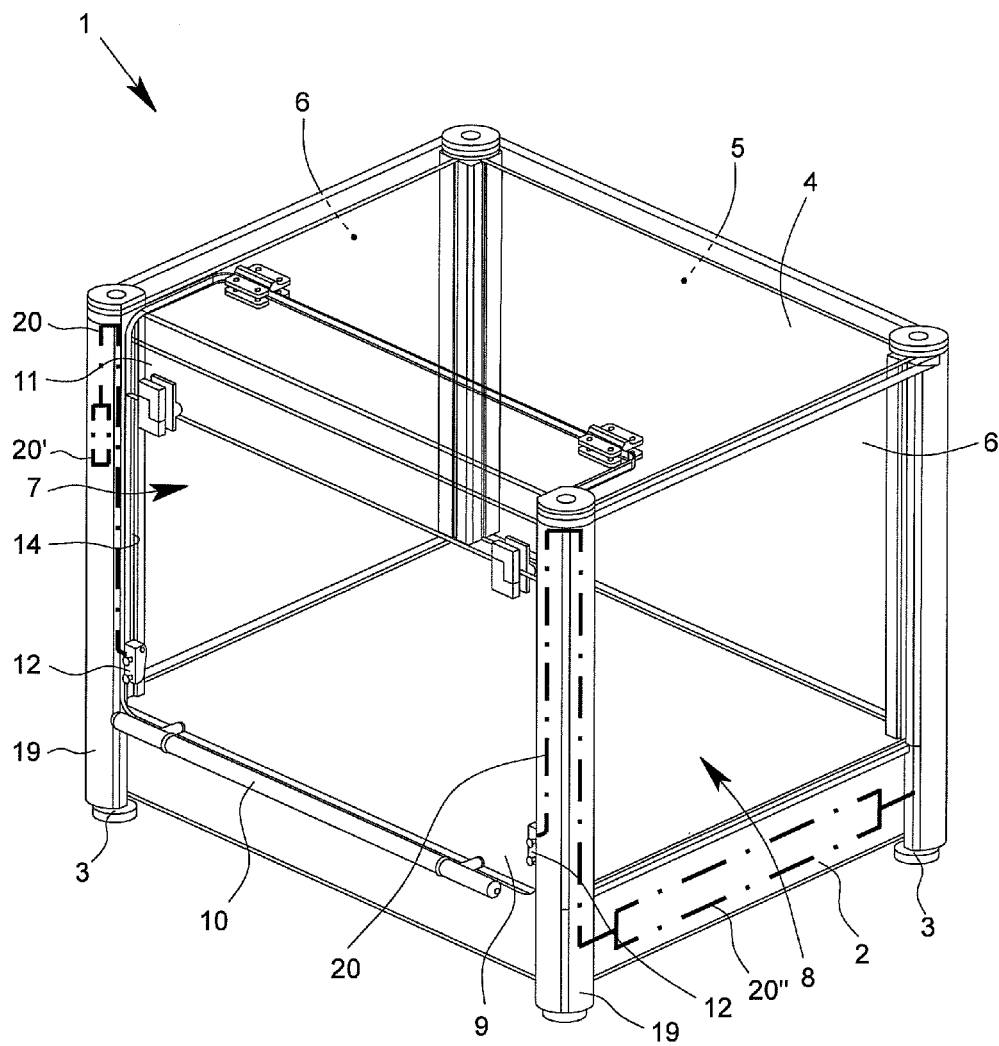
FIG. 4 is a schematic representation, based on FIG. 1, of a modified version of the housing shown in FIG. 1.

There are now yet further various options of designing and refining the housing 1 according to the invention in one or another direction with technical details. FIG. 4 shows, indicated in schematic representation, some variants.

According to FIG. 4, in the preferred illustrative embodiment which is shown there, it is provided that to the respective lateral guide 14, which is here disposed in the respective corner element 19, is assigned a weight balancing mechanism 20. In FIG. 4 a weight balancing mechanism 20 can be seen on the left, indicated as a cable control with counterweight 20'. On the right can be seen the example of a weight balancing mechanism 20 indicated as a cable control with tension spring 20". In the represented illustrative embodiment, the tension spring 20" is arranged horizontally in the floor 2 of the housing 1, because a longer tension path is available there.

Figure 5:
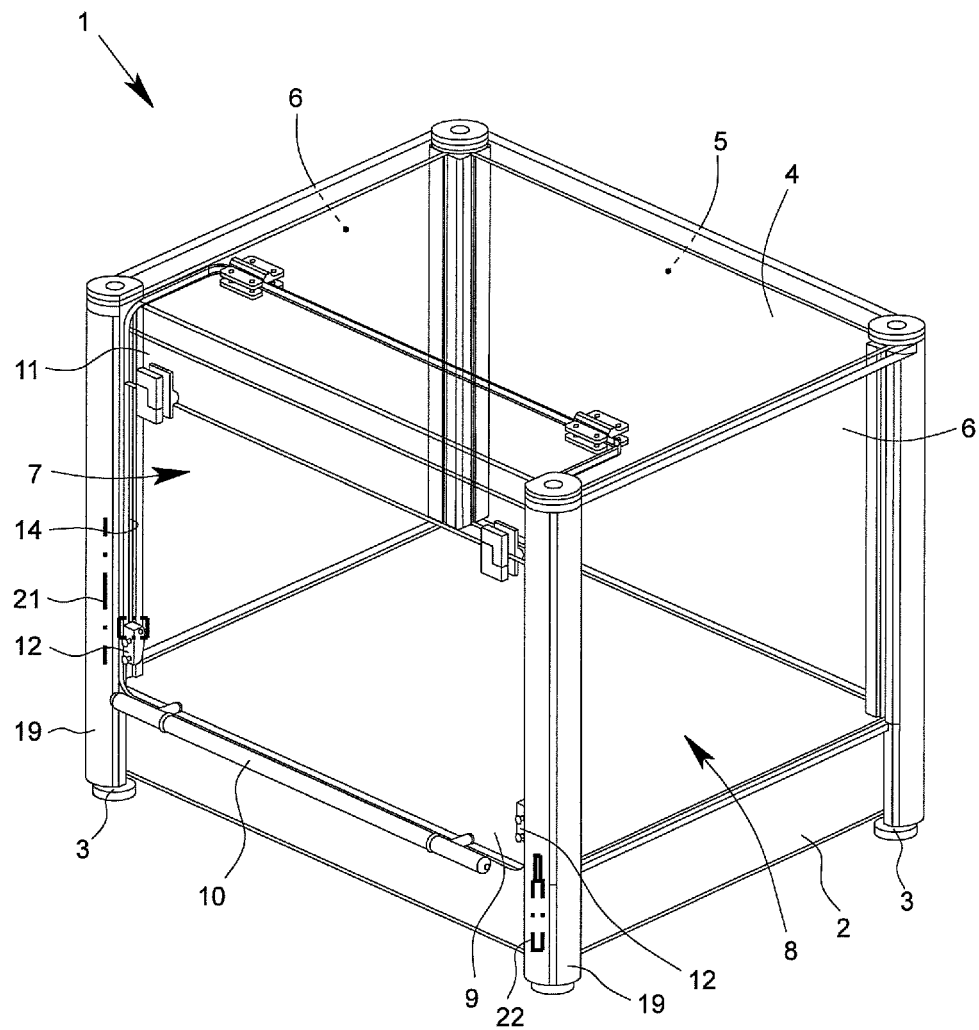
FIG. 5 shows in schematic representation, based on FIG. 1, another modified version of the housing from FIG. 1.

FIG. 5 shows further particularities which can be realized on a housing 1 according to the invention. On the left on the corner element 19 in FIG. 5 is indicated a lowering brake 21, while on the right is indicated an end position damping mechanism 22. The lowering brake 21 represented on the left, which according to the preferred teaching would then, in practice, be doubly provided, i.e., on the right and on the left, brakes the downwardly directed movement in the closing movement of the front wall 7, so that the front wall 7 gently reaches its final closed position. The end position damping mechanism 22 for the front wall 7, which is represented on the right and which in practice, when used, would also be fitted on both sides of the front wall 7, likewise, serves as a type of lowering brake, though only in the last section of the closing movement of the front wall 7.

Designs for lowering brakes 21 and end position damping mechanism 22 are extensively known from the prior art. These structural elements are known from the interior fittings of furniture items and for a host of other applications. A particularly expedient illustrative embodiment of a lowering brake 21 is a rotary brake (e.g., see, ACE "rotary brakes", 6.2011). In a rotary brake, a rotor turns in a silicone bed. Through shearing of the thin silicone layers between the faces of the rotor and of a stator surrounding the latter, a braking of the rotary movement of the rotor is induced. The braking torque is determined by the viscosity of the fluid and the dimensioning of the gaps between rotor and stator.

In conjunction with a gear rack indicated on the left in FIG. 5 and a pinion on the rotary brake, also a linear lowering movement can be braked with a rotary brake. A rotary brake has the advantage that the braking direction can be chosen. Here, it would specifically be the direction of the closing movement of the front wall 7.

In the top region of the opening movement of the front wall 7, the weight balancing of the front wall 7 by the rearward pivoting of the top wall portion 11 with the connecting portion 15 takes place. There, a braking is no longer necessary. Hence, according to the preferred teaching of the invention, it is particularly expedient that the weight balancing mechanism 20 and/or the lowering brake 21 is arranged and configured such that it has a braking effect only on a bottom portion of the closing movement of the front wall 7.

The system of the lowering brake can also be assigned to the pivot axes, in particular hinges 16 or 18 on the wall portions 9 and 11 or the connecting portion 15. Here too, it is then advisable that the lowering brake is arranged and configured such that it has a braking effect only in the closing movement of the front wall 7. This can be realized particularly expediently if a rotary brake is used, because the movement to be braked, at the pivot axes or hinges, is anyway, of course, a rotary movement.

What is claimed is:

1. A housing for a laboratory instrument, comprising:
   a floor,
   a ceiling,
   a rear wall,
   side walls and a front wall, wherein the floor, ceiling, rear wall, side walls and front wall jointly form a working chamber, wherein the front wall is linearly and, at the same time, pivotably movable upward and downward between a lowered closed position and a raised open position, and in the opening position of the front wall, the working chamber is open on a front side of the housing, wherein the front wall has a plate-shaped bottom wall portion and a plate-shaped top wall portion that is pivotably connected to the bottom wall portion about a first horizontal pivot axis, wherein the bottom wall portion is provided at or close to the bottom edge and has lateral guide elements which mutually define a second pivot axis that is parallel to the first pivot axis and about which the bottom wall portion is pivotable, wherein vertically upward-running lateral guides are arranged at the right and at the left side of the front wall in which the lateral guide elements are movable upward and downward, wherein the top wall portion merges arcuately into a plate-like connecting portion that runs at an angle to the top wall portion in an angularly rigid manner, and wherein the connecting portion, on an edge remote from the top wall portion, is pivotably attached to the ceiling at a distance from the front wall for rotation about a third pivot axis that is parallel to the first pivot axis.

2. The housing as claimed in claim 1, wherein the connecting portion is arranged at a right angle to the top wall portion, and has substantially the same width as the top wall portion of the front wall.

3. The housing as claimed in claim 1, wherein the wall portions are formed of transparent material that is at least broadly impermeable to UV light.

4. The housing as claimed in claim 1, wherein the wall portions are formed of transparent material that is opaque to visible light.

5. The housing as claimed in claim 1, wherein the ceiling has a recess in a region of the connecting portion which emanates from the front wall and which is matched in size to the connecting portion so that, when the front wall is in a closed position, the connecting portion closing the ceiling laying in the recess.

6. The housing as claimed in claim 1, wherein the ceiling has a recess in an edge region emanating from the front wall of such a depth that the bottom wall portion does not touch an edge of the recess during upward and downward movement and the connecting portion lies on the ceiling and covers the recess when the front wall is in the closed position.

7. The housing as claimed in claim 1, wherein at least one hinge is provided for pivotably connecting the top wall portion to the bottom wall portion, the at least one hinge having pivot path which is stop-limited at 180°.

8. The housing as claimed in claim 1, wherein at least one hinge is provided for pivotably connecting the connecting portion to the ceiling.

9. The housing as claimed in claim 1, wherein the top wall portion has a height that is 10% to 40% of the height of the front wall as a whole.

10. The housing as claimed in claim 1, wherein the connecting portion has a depth that is 10% to 40% of the depth of the ceiling as whole.

11. The housing as claimed in claim 1, wherein the side walls have edges which face toward the front wall and which are provided with vertically arranged corner elements on which the lateral guides are disposed.

12. The housing as claimed in claim 1, wherein each lateral guide is provided with one of a weight balancing mechanism, a lowering brake, and an end position damping mechanism for the front wall.

13. The housing as claimed in claim 1, wherein each lateral guide is provided with a lowering brake formed as a rotary brake with a pinion and gear rack.

14. The housing as claimed in claim 1, wherein each lateral guide is provided with at least one of a weight balancing mechanism and a lowering brake, and wherein the at least one of the weight balancing mechanism and the lowering brake is arranged and configured such that it has a braking effect only in a bottom section of a closing movement of the front wall.

15. The housing as claimed in claim 1, wherein a rotary lowering brake is arranged and configured such that it has a braking effect only in a closing movement of the front wall.

16. The housing as claimed in claim 1, wherein the bottom wall portion is formed of two or more mutually coupled sections.

* * * * *